H. A. TEMPLETON & A. A. BAILEY.
EGG TURNING TRAY FOR INCUBATORS.
APPLICATION FILED AUG. 13, 1912.
1,083,469.
Patented Jan. 6, 1914.
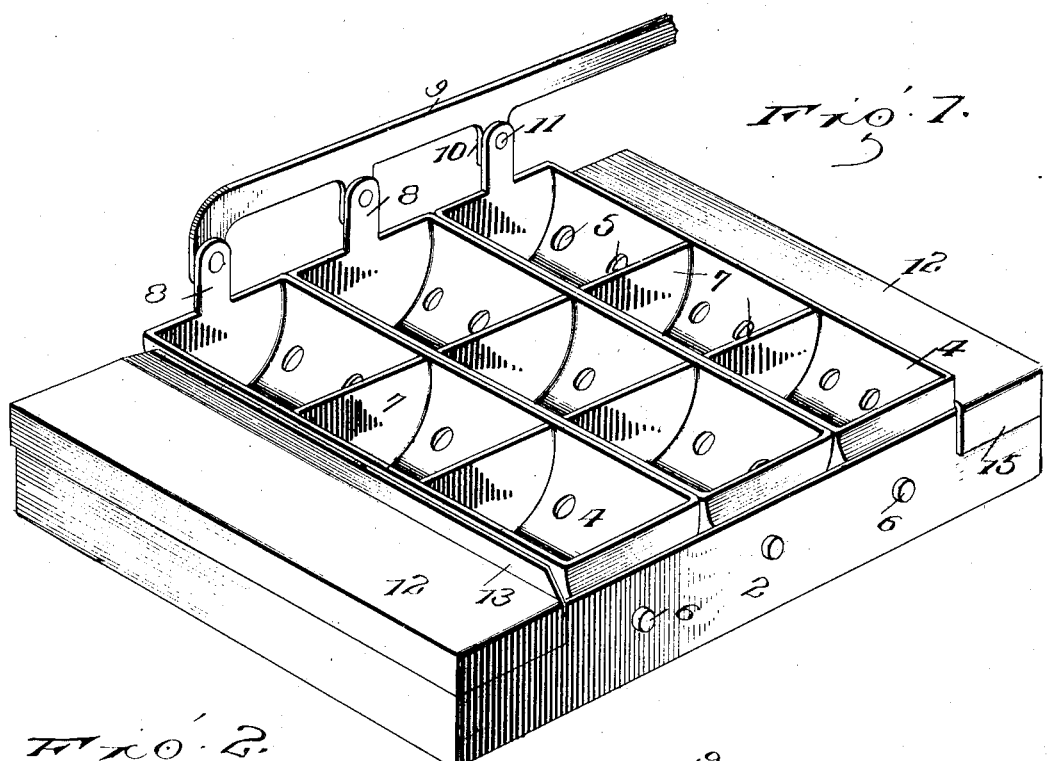
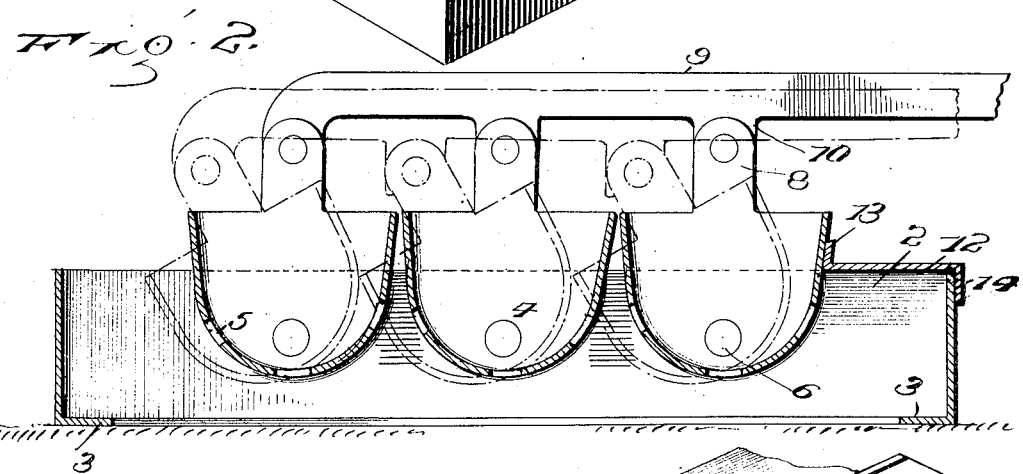
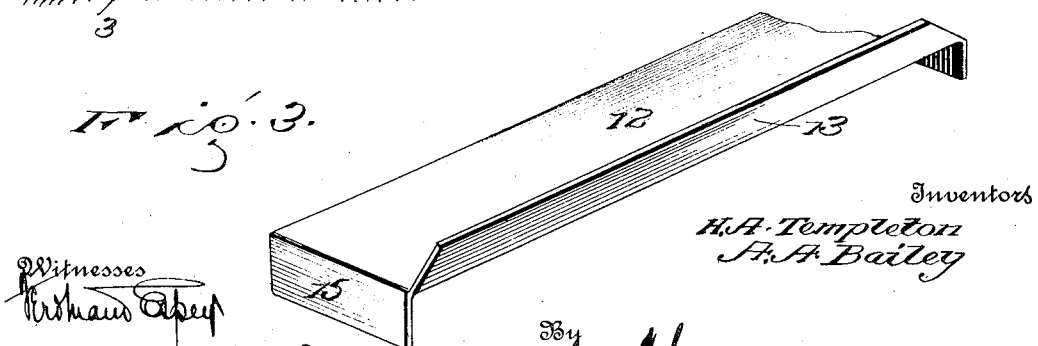

UNITED STATES PATENT OFFICE.

HENRY A. TEMPLETON AND ALFRED A. BAILEY, OF SULTAN, WASHINGTON.

EGG-TURNING TRAY FOR INCUBATORS.

1,083,469.  Specification of Letters Patent.  Patented Jan. 6, 1914.

Application filed August 13, 1912. Serial No. 714,863.

*To all whom it may concern:*

Be it known that we, HENRY A. TEMPLETON and ALFRED A. BAILEY, citizens of the United States, residing at Sultan, in the county of Snohomish and State of Washington, have invented certain new and useful Improvements in Egg-Turning Trays for Incubators, of which the following is a specification.

Our invention relates to egg trays for incubators and particularly to that variety of incubators in which oscillating egg supports or carriers are provided wherein the eggs can be carried during the period of incubation and whereby the eggs may be readily turned from time to time, the egg carriers being so constructed that the small ends of the eggs will always be held below the large ends thereof.

One of the objects of our invention is to so mount these oscillatable egg carriers within the supporting tray that the egg carriers may be oscillated without removing the trays from the incubator.

A further object is to provide egg carriers divided into a series of individual egg compartments or pockets so that each egg may retain its regular position in the carrier during the entire period of incubation.

A further object is to provide adjustable plates or platforms which may be disposed upon the ends of the tray to be used on hatching day so as to provide a solid surface at the upper portion of the tray at each end thereof and thus eliminate the danger of the recently hatched chicks falling through and getting caught in the tray, as they are liable to do.

A further object of the invention is to provide means whereby the trays are maintained in vertical position while the chicks are breaking through the shells and the newly hatched chicks likewise prevented from falling through the supporting frame.

Other objects will appear in the course of the following description.

In the drawings: Figure 1 is a perspective view of our improved egg turning tray; Fig. 2 is a transverse section thereof and showing in dotted lines the trays turned to one position; Fig. 3 is a perspective view of one of the cover plates or platforms used at the end of the tray.

In the drawings 2 designates a rectangular frame having an inwardly extending flange 3 at its bottom. Disposed between the sides of this tray are a plurality of egg carriers designated 4. Each of these carriers is semi-cylindrical in form and each is preferably composed of sheet metal formed with a plurality of perforations 5 in the rounded bottoms of the carriers. Each carrier is rotatably mounted in the sides of the tray by means of the trunnions 6 which project from the ends of the carriers and through perforations in the sides of the tray. Each carrier is divided into a series of pockets by means of transverse partitions 7, each pocket being designed to contain one egg. In order to actuate the carriers, each carrier is formed with an upwardly projecting lug 8, and pivotally connected to the lugs of all the carriers is an actuating bar 9, formed with downwardly extending tongues 10 at intervals, these tongues coinciding with the upwardly projecting lugs 8 and being pivoted thereto by means of rivets 11.

In the ordinary use of the egg carrier during the period of incubation and before the chicks are hatched from the shell, it is necessary that there should be a free circulation of air around all of the carriers and through the perforations in the bottoms thereof; but at the time that the chicks are hatched it is necessary that the carriers be held from any accidental oscillation and that there should be no space between the carriers and the adjacent wall of the tray, and to this end there are provided end cover pieces designated 12 each having an upwardly extending front flange 13, a downwardly extending outer flange 14, and side flanges 15. The flange 14 and the flange 15 are adapted to embrace the end of the tray and slidingly engage the same so that at the time of hatching the covers or plates 12 may be adjusted up against the edge of the adjacent carrier in the manner shown in Fig. 1, and thus hold the trays from turning and also to afford a floor or platform for the egg tray upon which the chicks may step after leaving the egg carriers and also to afford a guard preventing the chicks from falling between the end of the tray, the frame and the adjacent carrier.

An egg tray with the egg carriers constructed as described is very cheaply made, is strong, simple in operation, and has been found to be thoroughly effective in practice. The eggs may be turned as often as necessary without raising the smaller ends of the eggs above the larger ends thereof, and as the tray is divided into individual compartments, there is no chance for the eggs to become mixed or to get displaced from their proper positions.

While we have illustrated the trays as being formed with three egg carriers, it will of course be understood that a greater number will be used in practice.

A particularly important feature of our invention resides in the fact that each egg is contained within an individual egg compartment. It is impossible to get a setting of eggs, all of which will be fertile when they are tested and culled out. In our improved egg tray each egg will retain its original position during the entire period of incubation.

Having described our invention, what is claimed as new is:

1. In a device of the class described, an open frame, a plurality of egg supporting trays arranged side by side and mounted for oscillation in said frame, and combined stop members and platforms detachably engaging said frame and bearing against the outer trays and holding all of the trays in vertical position.

2. In a device of the class described, an open frame, a plurality of egg supporting trays arranged side by side and mounted for oscillation in said frame with their upper edges in close proximity when in vertical position, and combined stop members and platforms detachably engaging said frame and bearing against the outer trays and holding all of the trays in vertical position.

3. In a device of the class described, an open frame, a plurality of egg supporting trays arranged side by side and mounted for oscillation in said frame, and combined stop members and platforms detachably engaging said frame and having upwardly directed flanges bearing against the outer trays and holding them in vertical position.

In testimony whereof we affix our signatures in presence of two witnesses.

HENRY A. TEMPLETON. [L. S.]
ALFRED A. BAILEY. [L. S.]

Witnesses:
FRED YOUNG,
GERTRUDE GORDON.